(12) United States Patent
Sargent (10) Patent No.: US 10,907,734 B1
(45) Date of Patent: Feb. 2, 2021

(54) KINETICALLY DEPOSITED METAL RING SEAL

(71) Applicant: Lockheed Martin Corporation, Bethesda, MD (US)

(72) Inventor: Kenneth R. Sargent, Montverde, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 116 days.

(21) Appl. No.: 16/229,910

(22) Filed: Dec. 21, 2018

Related U.S. Application Data (60) Provisional application No. 62/609,430, filed on Dec. 22, 2017.

(51) Int. Cl.
*F16J 15/08* (2006.01)
*F16L 23/20* (2006.01)
*F02K 9/34* (2006.01)

(52) U.S. Cl.
CPC ............... *F16J 15/08* (2013.01); *F16L 23/20* (2013.01); *F02K 9/343* (2013.01)

(58) Field of Classification Search
CPC ...... F16J 15/08; F16J 15/06; F16J 15/061–02; F16J 15/0831; F16J 15/02; F16J 15/021–02; F16J 15/20; F16J 15/18; F16J 15/16; F16J 15/062; F02K 9/343; F02K 9/34; F16L 23/20; F16L 23/16; F16L 23/18
USPC .......................................................... 277/590
See application file for complete search history.

(56) References Cited

U.S. PATENT DOCUMENTS

| | | | | |
|---|---|---|---|---|
| 1,478,108 A | * | 12/1923 | Dieter .................. | F16J 15/0881 277/653 |
| 3,044,256 A | * | 7/1962 | Bayly ....................... | F02K 9/34 220/588 |
| 3,852,124 A | * | 12/1974 | Fassell ................. | C25D 11/246 148/261 |
| 4,520,364 A | * | 5/1985 | Perry ....................... | H01Q 1/42 343/872 |
| 8,192,792 B2 | | 6/2012 | Haynes et al. | |
| 2006/0207094 A1 | | 9/2006 | Allen et al. | |

(Continued)

FOREIGN PATENT DOCUMENTS

| | | |
|---|---|---|
| WO | 2015112662 A1 | 7/2015 |
| WO | 2017072735 A1 | 5/2017 |

*Primary Examiner* — Nathan Cumar
(74) *Attorney, Agent, or Firm* — Withrow & Terranova, PLLC

(57) ABSTRACT

Disclosed herein is a kinetically deposited metal ring seal. In particular, disclosed herein is a joint assembly including a housing, a component, and a seal assembly. The housing defines an opening and a central axis. The component is positioned proximate the opening of the housing. The seal assembly comprises a kinetically deposited metal layer attaching the housing to the component and forming an airtight barrier around the central axis between the housing and the component. The kinetically deposited metal layer comprises a plurality of plasticized metal particles. Accordingly, the kinetically deposited metal layer can be applied at low temperatures, ensuring the temperature stays below the activation temperature of loaded fuel. Further, the kinetically deposited metal layer forms a low volume, airtight seal, which does not degrade over time, and does not require application of high forces to maintain the seal.

21 Claims, 10 Drawing Sheets

(56) References Cited

U.S. PATENT DOCUMENTS

2010/0170937 A1    7/2010   Calla
2014/0312575 A1*   10/2014   Barry ...................... F42B 10/14
                                                                                                   277/654
2018/0221985 A1    8/2018   Amira et al.

* cited by examiner

KINETICALLY DEPOSITED METAL RING SEAL

RELATED APPLICATION

This application claims the benefit of U.S. Provisional Application No. 62/609,430, filed on Dec. 22, 2017, entitled "KINETICALLY DEPOSITED METAL RING SEAL," the disclosure of which is hereby incorporated herein by reference in its entirety.

TECHNICAL FIELD

The embodiments relate to seals, and in particular to a kinetically deposited metal ring seal for a missile casing assembly.

BACKGROUND

Rocket motor sections are often assembled by bolted assemblies with gasket seals because often assembly must be performed at temperatures below the activation temperature of loaded fuel in the rocket motor. However, there are a variety of problems associated with using gasket seals in rocket motors, and other assemblies.

Sealant material of a gasket seal is typically a fluoroelastomer, which degrades over time (e.g., prior to rocket fire in response to storage conditions and/or field environment, etc.). If not properly accounted for, the seal can be compromised, and such sealant material failure allows hot gases to escape, which can lead to catastrophic failure. For example, in the Space Shuttle Challenger accident, cold atmospheric temperature affected an O-ring seal in one of the solid rocket boosters, which led to the explosion and fire of the shuttle. Additionally, in certain applications, the gasket seal encloses hot gases, which may burn through the gasket seal. Further, sealing with a gasket seal requires physical space and careful assembly to account for these limitations of the sealant material and forces that will push the joint apart. Accordingly, an excess of sealant is usually used in anticipation of seal degradation and consumption, and other factors.

SUMMARY

Disclosed herein is a kinetically deposited metal ring seal. In particular, disclosed herein is a joint assembly including a housing, a component, and a seal assembly. The component is positioned proximate an opening of the housing. The seal assembly includes a kinetically deposited metal layer of a plurality of plasticized metal particles around a central axis of the housing that attaches and forms an airtight barrier between the housing and the component. Accordingly, the kinetically deposited metal layer can be applied at low temperatures ensuring the temperature stays below the activation temperature of loaded fuel or other critical components. Further, the kinetically deposited metal layer forms a low volume, airtight seal, which does not degrade over time, and does not require application of high forces to maintain the seal.

In one embodiment, a joint assembly includes a housing, a component, and a seal assembly. The housing defines an opening and a central axis. The component is positioned proximate the opening of the housing. The seal assembly includes a first kinetically deposited metal layer attaching the housing to the component and forming an airtight barrier around the central axis between the housing and the component.

In another embodiment, a method of manufacturing a joint assembly includes positioning a component proximate an opening of a housing. The method further includes kinetically depositing a first metal layer to attach the housing to the component and form an airtight barrier around a central axis of the housing between the housing and the component.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 1A is a cross-sectional side view of a general joint assembly with a kinetically deposited metal seal;

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps.

The use herein of ordinals in conjunction with an element is solely for distinguishing what might otherwise be similar or identical labels, such as "first end" and "second end," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

The use herein of "annular" means surrounding, which may include circular shapes or any other type of shape.

The use herein of "proximate" means at, next to, or near.

Disclosed herein is a kinetically deposited metal ring seal. In particular, disclosed herein is a joint assembly including a housing, a component, and a seal assembly. The housing defines an opening and a central axis. The component is positioned proximate the opening of the housing. The seal assembly comprises a kinetically deposited metal layer attaching the housing to the component and forming an airtight barrier around the central axis between the housing and the component. The kinetically deposited metal layer comprises a plurality of plasticized metal particles. Accordingly, the kinetically deposited metal layer can be applied at low temperatures, ensuring the temperature stays below the activation temperature of loaded fuel or other critical components. Further, the kinetically deposited metal layer forms a low volume, airtight seal, which does not degrade over time, and does not require application of high forces to maintain the seal.

FIG. 1A is a cross-sectional side view of a general joint assembly 100 (may also be referred to as a joint, etc.) with a kinetically deposited metal ring seal 102 (may also be referred to as a kinetically deposited metal seal, kinetically deposited metal band, a cold spray deposited metal seal, metallurgical seal, metallurgical closure, metallurgical barrier, metal ring seal, metal seal, annular seal, etc.). It is noted that here and elsewhere in the application, only a portion of the joint assembly 100 is shown for sake of clarity, and that the joint assembly 100 forms a mirror image across the axis A-A. In particular, the joint assembly 100 includes a first component 104 defining an axis A-A (e.g., central axis) and an opening 106 at a first end 108 of the first component 104, a second component 110 positioned proximate the opening 106 of the first component 104 at the first end 108 of the first component 104, and a metal seal 102. In certain embodiments, the first component 104 is a housing, tubular element, etc. In certain embodiments, the second component is a housing, tubular element, cap, etc. The metal seal 102 is ring shaped, but this is not limited to circular shapes. The ring shape of the metal seal 102 includes any enclosed shape. Further, the metal seal 102 includes one or more kinetically deposited metal layers. In this way, the metal ring seal 102 includes a plurality of plasticized metal particles. The metal seal 102 may be used in a variety of embodiments and applications. For example, in certain embodiments, the first component 104 may be a housing or tubular element, and the second component 110 may be a funnel, nozzle, cap, second housing, second tubular element, etc.

As explained in more detail below, the metal seal 102 provides a hermetic (airtight) seal configured to survive elevated temperatures with little or no degradation. The metal seal 102 locks the second component 110 relative to the first component 104 and prevents movement of the second component 110 relative to the first component 104. Further the geometry of the joint assembly 100 maximizes shear and compression forces on the metal seal 102 that aids in sealing in response to any increase in pressure and temperature within the first component 104 and/or second component 110. Further, the joint assembly 100 uses less physical space (lower volume), which maximizes an interior volume of the first component 104 and/or second component 110. Still further, the metal seal 102 reduces cost (e.g., elimination of expensive fasteners, solvents, glues, etc.). Accordingly, the metal seal 102 is durable (e.g., to hot gasses under pressure) and can be installed without raising the temperature of the substrate.

Figure 1B:
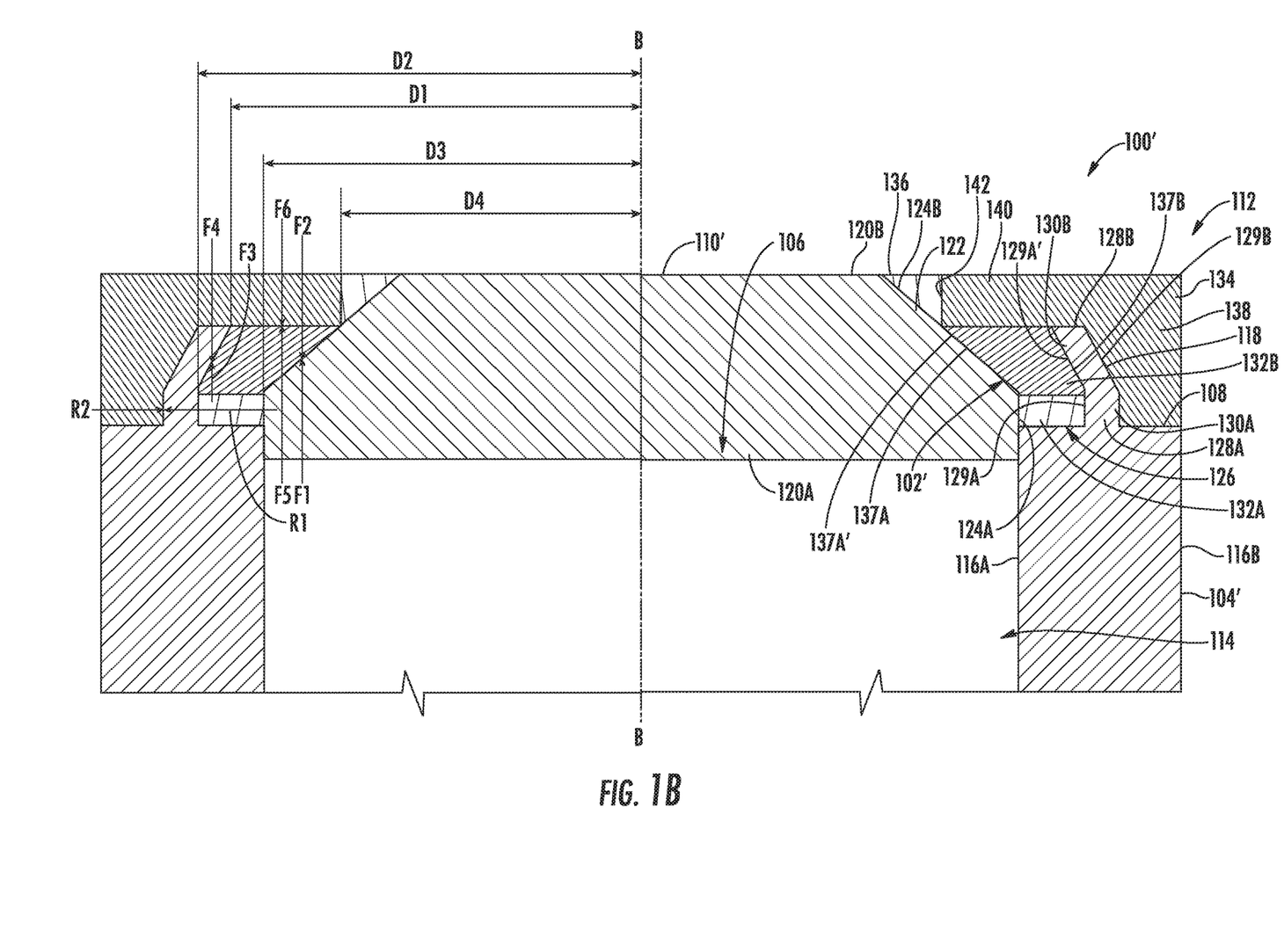
FIG. 1B is a cross-sectional side view of an embodiment of the joint assembly of FIG. 1A for a missile.

FIG. 1B is a cross-sectional side view of an embodiment of the joint assembly 100 of FIG. 1A for a missile. In particular, the joint assembly 100' (may also be referred to as a joint, etc.) includes a first component 104 embodied as a housing 104' (may also be referred to as a missile casing, tube, missile body, etc.) defining an axis B-B (e.g., central axis) and an opening 106 at a first end 108 of the housing 104', a second component 110 embodied as a cap 110' (may also be referred to as an end cap, etc.) positioned proximate the opening 106 of the housing 104' at the first end 108 of the housing 104', and a seal assembly 112 (including the metal seal 102').

The housing 104' defines an interior 114 that may contain, for example, rocket fuel. The housing 104' has an inner surface 116A, an outer surface 116B opposite thereto, and an annular tab 118 (may also be referred to as a continuously annular tab) proximate the opening 106 at the first end 108 of the housing 104' to provide structural support for attachment and formation of the metal seal 102' of the seal assembly 112. The housing 104' is generally cylindrically shaped (e.g., tubular shaped), although other shapes could be used (e.g., rotationally symmetric, rotationally asymmetric, etc.). Accordingly, in this embodiment, the axis B-B is a central axis centrally positioned in the interior 114 of the housing 104'. In other words, the cylindrical cross-section of the housing 104' extends along the axis B-B.

The cap 110' has an inner bottom surface 120A (may also be referred to as a bottom planar surface, etc.), an outer top surface 120B (may also be referred to as a top planar surface, etc.) opposite thereto, and a sidewall 122 (may also be referred to as an annular sidewall). Further, in this embodiment, the sidewall 122 includes a first side surface 124A (may also be referred to as an annular straight side surface, non-tapered side surface, etc.) proximate the inner bottom surface 120A and/or a second side surface 124B (may also be referred to as a top surface, top planar surface, etc.) proximate the outer top surface 120B. The second side surface 124B is angled (at a non-zero angle) relative to the first side surface 124A. As a result, the area of the inner bottom surface 120A is larger than the area of the outer top surface 120B.

At least a portion of the first side surface 124A of the cap 110' may be positioned in the opening 106 of the housing 104'. The housing 104' and the cap 110' form an annular groove 126 therebetween. In particular, the annular groove 126 is formed proximate the opening 106 and defined by the first end 108 of the housing 104' and between the annular tab 118 of the housing 104' and the sidewall 122 of the cap 110'. The annular tab 118 extends from the first end 108 of the housing 104' along the central axis B-B, and extends continuously along the perimeter of the opening 106 (e.g., around the axis B-B) to surround the opening 106. In particular, the annular tab 118 includes a first end 128A proximate the first end 108 of the housing 104', a second end 128B opposite thereto, an inner surface 129A (towards the interior 114 and/or axis B-B), and an outer surface 129B opposite thereto. Further, the annular tab 118 includes a straight portion 130A (proximate the first end 108 of the housing 104') and a bent portion 130B extending from the straight portion 130A (such that the straight portion 130A is positioned between the first end 108 of the housing 104' and the bent portion 130B).

The inner surface 129A of the bent portion 130B of the annular tab 118 forms an undercut surface 129A' inwardly extending toward the central axis B-B of the housing 104'. In other words, as the annular tab 118 extends from the first end 108 of the housing 104' away from the housing 104' along the central axis B-B, the annular tab 118 also extends inwardly toward the central axis B-B. In particular, the distance D1 of the first end 128A of the annular tab 118 to the axis B-B of the housing 104' (and/or interior 114 of the housing 104') is less than the distance D2 of the second end 128B of the annular tab 118 to the axis B-B of the housing 104' (and/or interior 114 of the housing 104'). The undercut surface 129A' defined by the inner surface 129A of the bent portion 130B of the annular tab 118 provides a reciprocating axial force to prevent the cap 110' from translating axially relative to the housing 104', as explained in more detail below.

The metal seal 102' includes a first kinetically deposited metal layer 132A and a second kinetically deposited metal layer 132B. In this way, the metal seal 102' may be made entirely of metal. The seal assembly 112 further includes a retaining ring 134 and a third kinetically deposited metal layer 136. One or more of the first kinetically deposited metal layer 132A, the second kinetically deposited metal layer 132B, the retaining ring 134, and/or the third kinetically deposited metal layer 136 are made of metal (e.g., aluminum chrome), and in certain embodiments all are entirely made of metal.

The first kinetically deposited metal layer 132A is formed within the annular groove 126 proximate the first end 108 of the housing 104' (e.g., between the straight portion 130A of the annular tab 118 and the first side surface 124A of the sidewall 122 of the cap 110'). In particular, the first kinetically deposited metal layer 132A is attached to (e.g., directly physically contacts) the inner surface 129A of the straight portion 130A of the annular tab 118, the first end 108 of the housing 104', and the first side surface 124A of the sidewall 122 of the cap 110'. Of course, other geometries could be used depending on the size and shape of the housing 104' and/or cap 110'. The first kinetically deposited metal layer 132A attaches the housing 104' to the cap 110' and forms an airtight barrier around the central axis B-B between the housing 104' and the cap 110'.

The second kinetically deposited metal layer 132B is formed within the annular groove 126 proximate the first kinetically deposited metal layer 132A (such that the first kinetically deposited metal layer 132A is positioned between the first end 108 of the housing 104' and the second kinetically deposited metal layer 132B). In other words, the second kinetically deposited metal layer 132B is proximate to and axially offset from the first kinetically deposited metal layer 132A. In particular, the second kinetically deposited metal layer 132B is attached to (e.g., directly physically contacts) the inner surface 129A of the bent portion 130B of the annular tab 118, the first kinetically deposited metal layer 132A, and the second side surface 124B of the sidewall 122 of the cap 110'. The second kinetically deposited metal layer 132B forms an airtight barrier around the central axis B-B of the housing 104' between the undercut surface of the annular tab 118 of the housing 104' and the second side surface 124B of the sidewall 122 of the cap 110'.

The second kinetically deposited metal layer 132B includes an inner surface 137A (towards the interior 114 and/or axis B-B), and an outer surface 137B opposite thereto. The inner surface 137A of the second kinetically deposited metal layer 132B forms an undercut surface 137A' inwardly extending toward the central axis B-B of the housing 104'. In other words, at least a portion of the second kinetically deposited metal layer 132B extends further inward toward a central axis B-B of the housing 104' than the first kinetically deposited metal layer 132A. The distance D3 of a portion of the first kinetically deposited metal layer 132A closest to the axis B-B of the housing 104' (and/or interior 114 of the housing 104') is still greater than the distance D4 of a portion of the second kinetically deposited metal layer 132B closest to the axis B-B of the housing 104' (and/or interior 114 of the housing 104'). In particular, the distance D3 of the first end 128A of the annular tab 118 to the axis B-B of the housing 104' (and/or interior 114 of the housing 104') is less than the distance D4 of the second end 128B of the annular tab 118 to the axis B-B of the housing 104' (and/or interior 114 of the housing 104'). The undercut surface 137A' defined by the inner surface 137A of the second kinetically deposited metal layer 132B provides a reciprocating axial force to prevent the cap 110' from translating axially relative to the housing 104', as explained in more detail below.

The retaining ring 134 (may also be referred to as a metal band) has an annular body 138 and an overhang wall 140 inwardly extending from the annular body 138. The annular body 138 is made of metal and press fit to an exterior of the housing 104', specifically the outer surface 129B of the annular tab 118. At least a portion of the second kinetically deposited metal layer 132B is positioned between the first kinetically deposited metal layer 132A and the overhang wall 140. The retaining ring 134 radially pushes against the annular tab 118 if the housing 104' expands radially (e.g., from thermal expansion upon ignition of rocket fuel). Accordingly, in response to a radial force R1, the retaining ring 134 provides a reciprocating axial force R2 to prevent the cap 110' from translating radially relative to the housing 104' (e.g., and potentially damaging the metal seal 102'). Additionally, the retaining ring 134 axially pushes against the cap 110', such as directly and/or indirectly through the metal seal 102', as the cap 110' may be forced axially away from the housing 104' (e.g., from ignition of rocket fuel).

The third kinetically deposited metal layer 136 attaches the overhang wall 140 of the retaining ring 134 and the cap 110'. In certain embodiments, the third kinetically deposited metal layer 136 is planar with the outer top surface 120B of the cap 110' and/or the overhang wall 140. For example, in certain embodiments, the third kinetically deposited metal layer 136 is attached to (e.g., directly physically contacts) the second side surface 124B of the sidewall 122 and an inner surface 142 of the overhang wall 140 of the retaining ring 134.

The first and second kinetically deposited metal layers 132A, 132B each include a plurality of plasticized metal particles. In certain embodiments, the first and second kinetically deposited metal layers 132A, 132B include physical mixtures of ceramics and metals, where the choice of material is based principally on shear strength at interface between the housing 104' and the cap 110'. For example, sealant metals may include those metals with ten times the thermal degradation point of a fluoroelastomer.

The geometry of the joint assembly 100', and the selection of materials of the housing 104', cap 110', and/or seal assembly 112 are engineered to maximize self-energizing sealing force as the joint assembly 100' is exposed to increases in temperature and/or pressure. For example, if the housing 104' contains rocket fuel, then upon ignition, the housing 104' will thermally expand radially and an axial force may be imparted on the cap 110' relative to the housing 104'. The joint assembly 100' and metal seal 102' work together to prevent radial expansion of the housing 104' at the joint assembly 100' and to prevent axial translation (and/or radial translation) of the cap 110' relative to the housing 104'.

The seal assembly 112 and, in particular the metal seal 102', provide a hermetic (airtight) seal configured to survive elevated temperatures (e.g., from rocket fire) with little or no degradation. The metal seal 102' locks the cap 110' and prevents the cap 110' from moving out of the housing 104'. For example, combustion of fuel within the housing 104' creates an axial force F1 against the cap 110', urging the cap 110' to move axially (along axis B-B) relative to the housing 104'. In response to the axial force F1, the inner surface 137A of the second kinetically deposited metal layer 132B provides a reciprocating axial force F2 to prevent the cap 110' from translating axially relative to the housing 104'. Axial force F1 further results in an axial force F3 (parallel to and in the same direction as axial force F1) being exerted by the outer surface 137B of the second kinetically deposited metal layer 132B on the annular tab 118. In response to the axial force F3, the inner surface 129A of the bent portion 130B of the annular tab 118 provides a reciprocating axial force F4 to prevent the second kinetically deposited metal layer 132B and the cap 110' from translating axially relative to the housing 104'. Axial force F1 further results in an axial force F5 (parallel to and in the same direction as axial force F1) being exerted by the second kinetically deposited metal layer 132B on the retaining ring 134. In response to the axial force F5, the retaining ring provides a reciprocating axial force F6 to prevent the second kinetically deposited metal layer 132B and the cap 110' from translating axially relative to the housing 104'.

Further, the geometry of the joint 100' maximizes shear and compression forces on the metal seal 102' that aids in sealing in response to increasing pressure and temperature. The joint 100' (particularly the metal seal 102') has an increased thermal degradation point compared to flouroelastomers. Further, the joint assembly uses less physical space (lower volume), which allows more fuel to be loaded into the motor. Still further, the seal assembly 112 reduces cost (e.g., elimination of expensive fasteners, solvents, glues, etc.), and improves performance (e.g., increased range due to more volume for fuel, less internal insulation used to protect polymer seals, etc.). In particular, the joint 100' and/or metal seal 102' may be used in solid rocket motor (SRM) missiles that go into service and may remain sealed for years prior to firing. Further, the joint 100' and/or metal seal 102' can withstand the rapid pressurization and thermal shock from solid rocket motors. The joint 100' and/or metal seal 102' can provide seals in high pressure vessels or other applications (e.g., greater than 3000 psi). The joint 100' and/or metal seal 102' is durable (e.g., to hot gasses under pressure) and can be installed without raising the temperature of the substrate and without open flames (or other explosion hazards). The joint 100' and/or metal seal 102' avoids elaborate containment systems (e.g., high strength fasteners, polymer seals, flanges, carefully fitted joints, etc.).

Figure 1C:
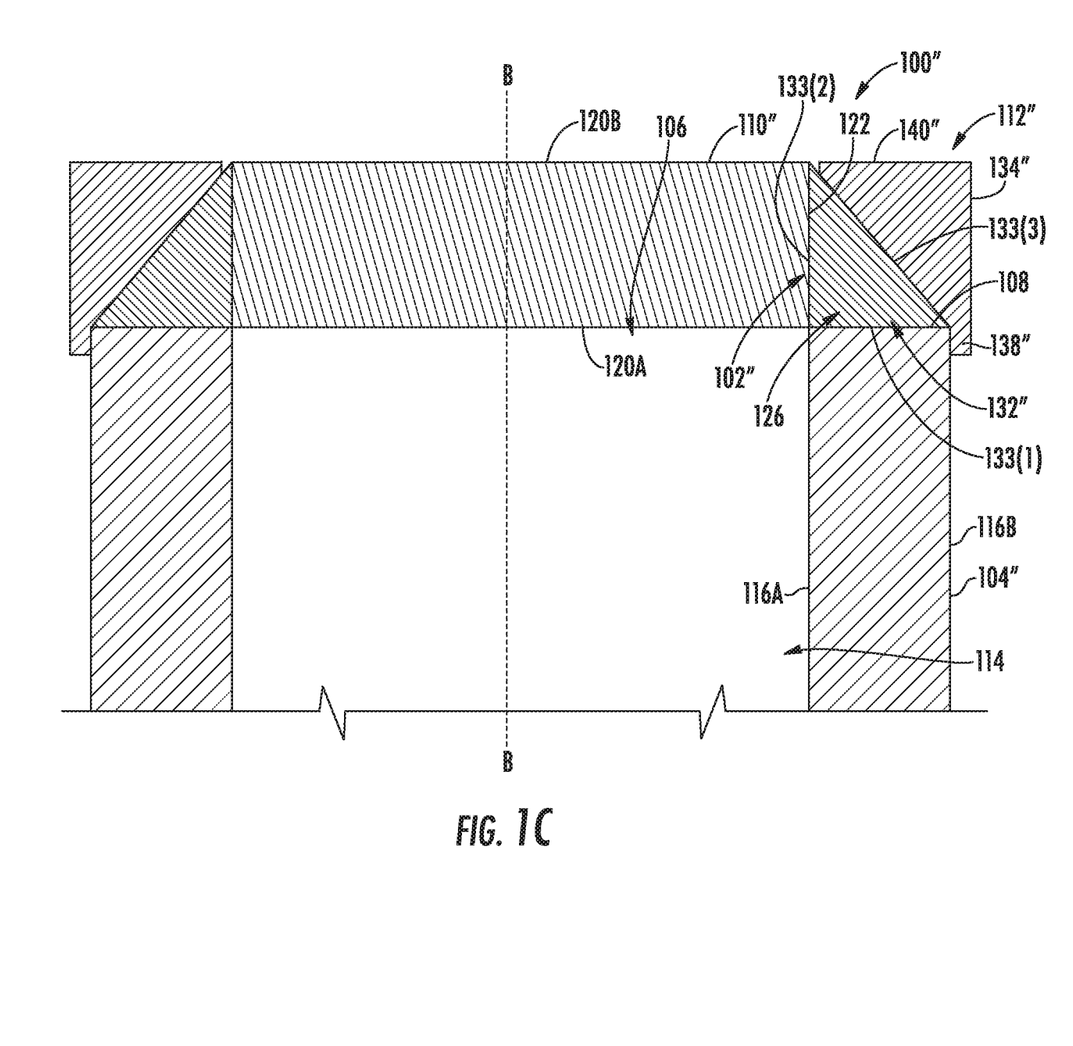
FIG. 1C is a cross-sectional side view illustrating another embodiment of the joint assembly of FIG. 1A with a kinetically deposited metal seal.

FIG. 1C is a cross-sectional side view illustrating another embodiment of the joint assembly 100 of FIG. 1A with a kinetically deposited metal seal 102". The joint assembly 100" of FIG. 1C includes similar features as those of FIGS. 1A and 1B and the discussion thereof similarly applies to FIG. 1C (except where otherwise noted). However, the joint assembly 100" does not require as much retention force, and as a result the metal seal 102" may be manufactured with fewer steps and/or components. Similar to the joint assembly 100' of FIG. 1B, the joint assembly 100" of FIG. 1C includes a housing 104" and an opening 106 at a first end 108 of the housing 104", a cap 110" positioned proximate the opening 106 of the housing 104" at the first end 108 of the housing 104", and a seal assembly 112".

The housing 104" defines an interior 114, has an inner surface 116A, an outer surface 116B opposite thereto. The axis B-B is a central axis centrally positioned in the interior 114 of the housing 104". The cap 110" has an inner bottom surface 120A, an outer top surface 120B opposite thereto, and a sidewall 122 of therebetween. At least a portion of the sidewall 122 of the cap 110" may be positioned in (or proximate to) the opening 106 of the housing 104". The housing 104" and the cap 110" form an annular groove 126 therebetween. In particular, the annular groove 126 is formed proximate the opening 106 and defined by the first end 108 of the housing 104" and the sidewall 122 of the cap 110". In other words, in certain embodiments, the annular groove 126 is defined by two surfaces at a right angle to one another.

The metal seal 102" includes a kinetically deposited metal layer 132" (e.g., cold spray deposited). In certain embodiments, the metal seal 102" only includes one kinetically deposited metal layer 132", such as to simplify construction and reduce costs. The kinetically deposited metal layer 132" is formed within the annular groove 126 proximate the first end 108 of the housing 104". In particular, the kinetically deposited metal layer 132" is attached to (e.g., directly physically contacts) the first end 108 of the housing 104" and the sidewall 122 of the cap 110". The metal seal 102" forms a triangular cross-section (e.g., a right angle cross-section) including a first surface 133(1) proximate (e.g., attached to) the first end 108 of the housing 104", a second surface 133(2) (e.g., at a right angle to the first surface 133(1)) proximate the sidewall 122 of the cap 110", and a third surface 133(3) (e.g., hypotenuse of triangular cross-section). Of course, other geometries could be used depending on the size and shape of the housing 104" and/or cap 110". The kinetically deposited metal layer 132" attaches the housing 104" to the cap 110" and forms an airtight barrier around the central axis B-B between the housing 104" and the cap 110".

The seal assembly 112" further includes a retaining ring 134". The retaining ring 134" has an annular body 138" and an overhang wall 140" inwardly extending from the annular body 138". The retaining ring 134" may be press fit onto the housing 104", cap 110", and/or kinetically deposited metal layer 132. In certain embodiments, the kinetically deposited metal layer 132 comprises (e.g., consists) of a material of greater strength, hardness, etc. than the housing 104" and/or cap 110".

The seal assembly 112" includes many of the same features and advantages as those discussed in FIGS. 1A and 1B above. For example, the joint assembly 100" and metal seal 102" work together to prevent radial expansion of the housing 104" at the joint assembly 100" and to prevent axial translation (and/or radial translation) of the cap 110" relative to the housing 104". The seal assembly 112" and, in particular the metal seal 102", provide a hermetic (airtight) seal configured to survive elevated temperatures with little or no degradation. The metal seal 102" locks the cap 110" and prevents the cap 110" from moving out of the housing 104". Further, the geometry of the joint 100" maximizes shear and compression forces on the metal seal 102" that aids in sealing in response to increasing pressure and temperature.

FIGS. 2A-7B illustrate steps of manufacturing the joint 100' of FIG. 1B. It is noted that one or more of these steps may be altered and/or omitted in forming the joint 100'.

Figure 2A:
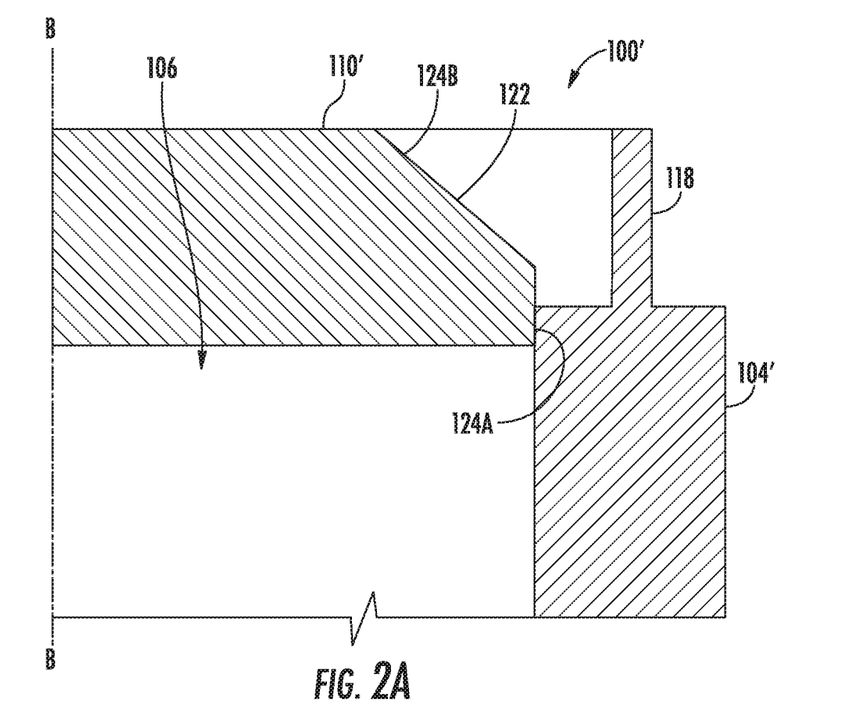
FIG. 2A is a cross-sectional side view illustrating a first step of manufacturing the joint assembly of FIG. 1B including positioning a component proximate a housing.
Figure 2B:
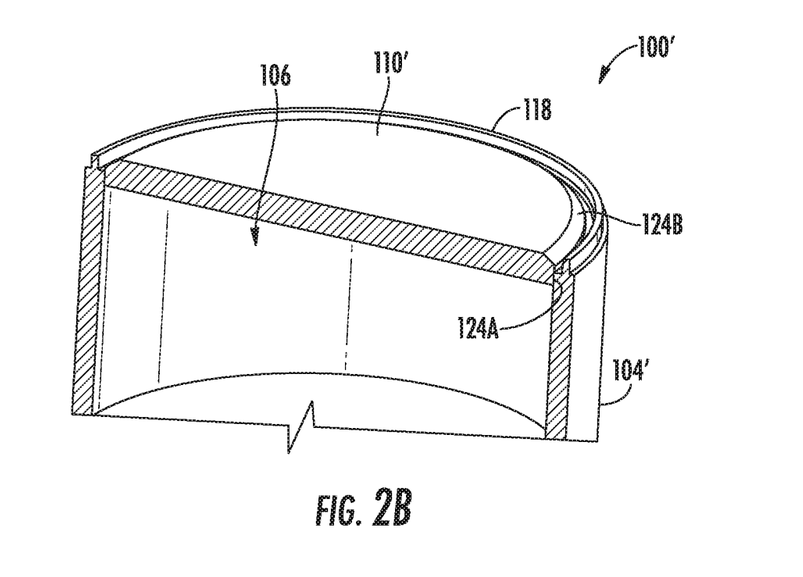
FIG. 2B is a cross-sectional perspective view of the step of FIG. 2A.

FIG. 2A is a cross-sectional side view illustrating a first step of manufacturing the joint 100' of FIG. 1B including positioning the cap 110' proximate a housing 104'. FIG. 2B is a cross-sectional perspective view of the step of FIG. 2A. It is noted that here and elsewhere in the application, only a portion of the joint assembly 100' is shown for sake of clarity, and that the joint assembly 100' forms a mirror image across the axis B-B. In particular, at least a portion of the first side surface 124A of the sidewall 122 of the cap 110' may be positioned in the opening 106 of the housing 104'. The annular tab 118 is in a straight orientation.

Figure 3A:
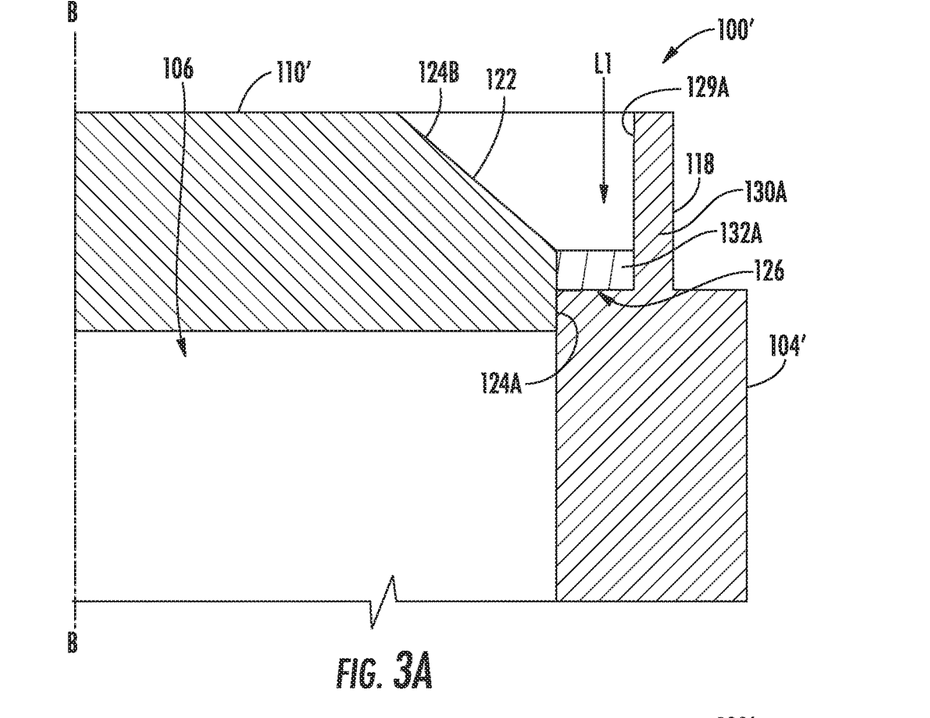
FIG. 3A is a cross-sectional side view illustrating another step of manufacturing the joint assembly of FIG. 1B including kinetically depositing a first metal layer.
Figure 3B:
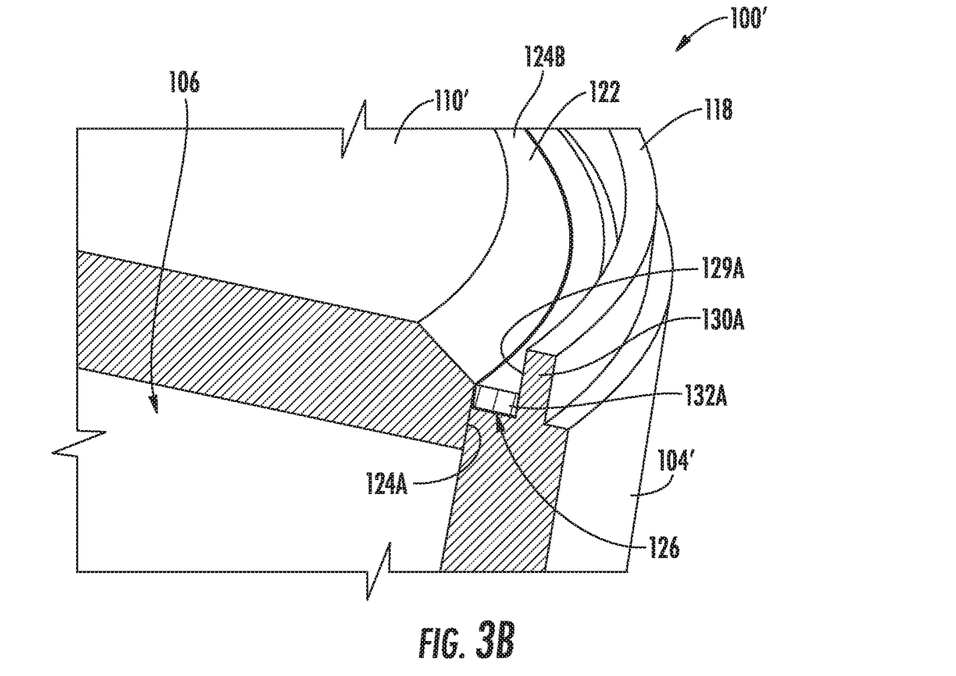
FIG. 3B is a cross-sectional perspective view of the step of FIG. 3A.

FIG. 3A is a cross-sectional side view illustrating another step of manufacturing the joint 100' of FIG. 1B including kinetically depositing a first kinetically deposited metal layer 132A. FIG. 3B is a cross-sectional perspective view of the step of FIG. 3A. As shown, the annular tab 118 is in a straight orientation to provide a direct line of sight L1 to kinetically deposit the first kinetically deposited metal layer 132A within the annular groove 126. The first kinetically deposited metal layer 132A is attached to (e.g., directly physically contacts) the inner surface 129A of the straight portion 130A of the annular tab 118, the first end 108 of the housing 104', and the first side surface 124A of the sidewall 122 of the cap 110'. The first kinetically deposited metal layer 132A forms an airtight barrier around the central axis B-B of the housing 104' between housing 104' and the cap 110'.

Figure 4:
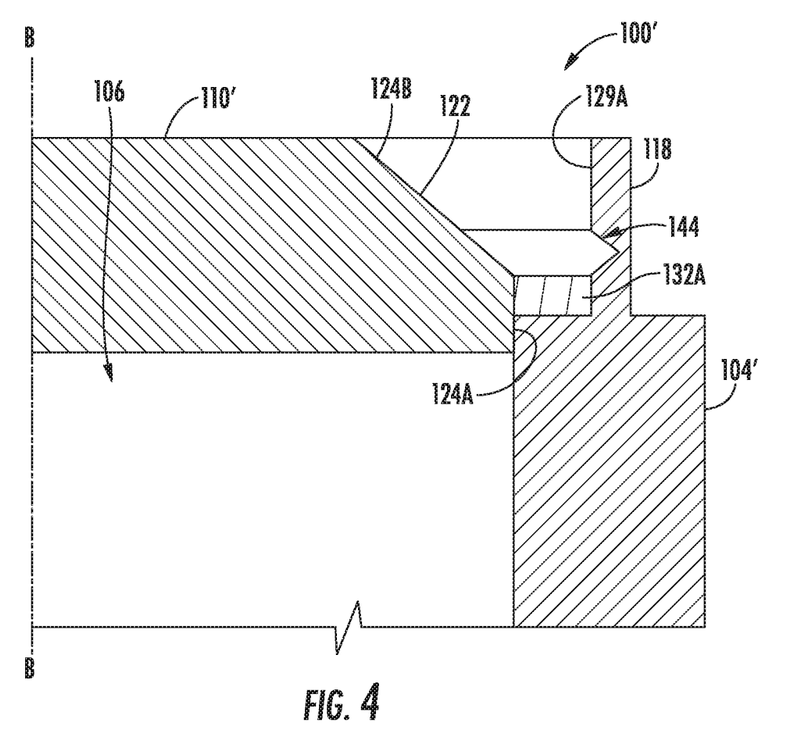
FIG. 4 is a cross-sectional side view illustrating another step of manufacturing the joint assembly of FIG. 1B including machining a notch out of an annular tab.

FIG. 4 is a cross-sectional side view illustrating another step of manufacturing the joint 100' of FIG. 1B including machining a notch 144 (may also be referred to as an inner notch) out of the annular tab 118. In particular, at least a portion of the inner surface 129A is removed to form a notch 144 in the inner surface 129A. The notch 144 is formed above the first kinetically deposited metal layer 132A. The notch 144 facilitates bending of the annular tab 118 as explained in more detail below.

Figure 5A:
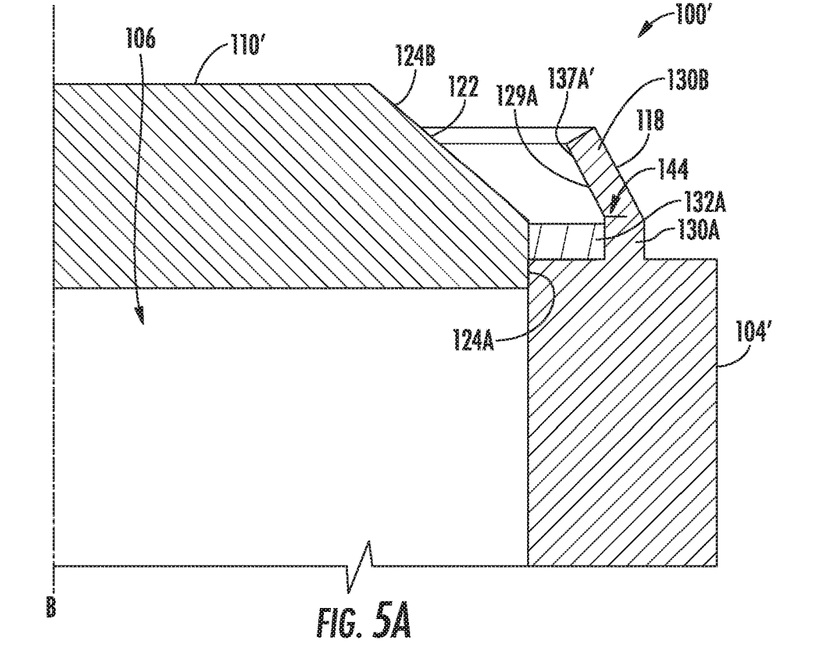
FIG. 5A is a cross-sectional side view illustrating another step of manufacturing the joint assembly of FIG. 1B including inwardly deflecting a portion of the annular tab to form an undercut surface.
Figure 5B:
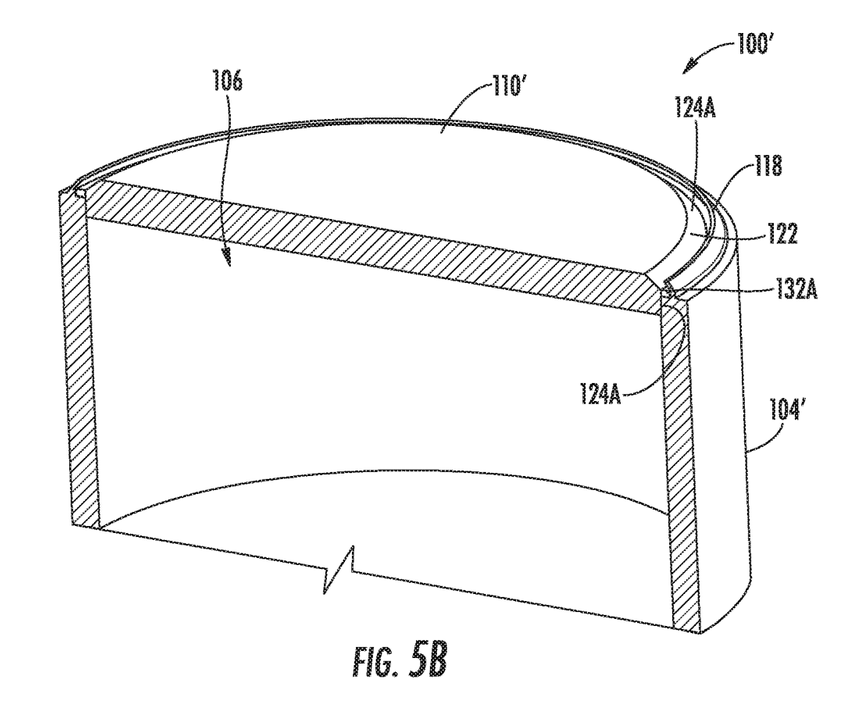
FIG. 5B is a cross-sectional perspective view of the step of FIG. 5A.

FIG. 5A is a cross-sectional side view illustrating another step of manufacturing the joint 100' of FIG. 1B including inwardly deflecting a portion of the annular tab 118 about the notch 144 to form an undercut surface 137A'. FIG. 5B is a cross-sectional perspective view of the step of FIG. 5A. In particular, inwardly deflecting the upper portion of the annular tab 118 relative to the straight portion 130A forms the bent portion 130B. This bent portion 130B includes the undercut surface 129A' to provide a reciprocating axial force to prevent the cap 110' from translating axially relative to the housing 104', as explained above.

Figure 6:
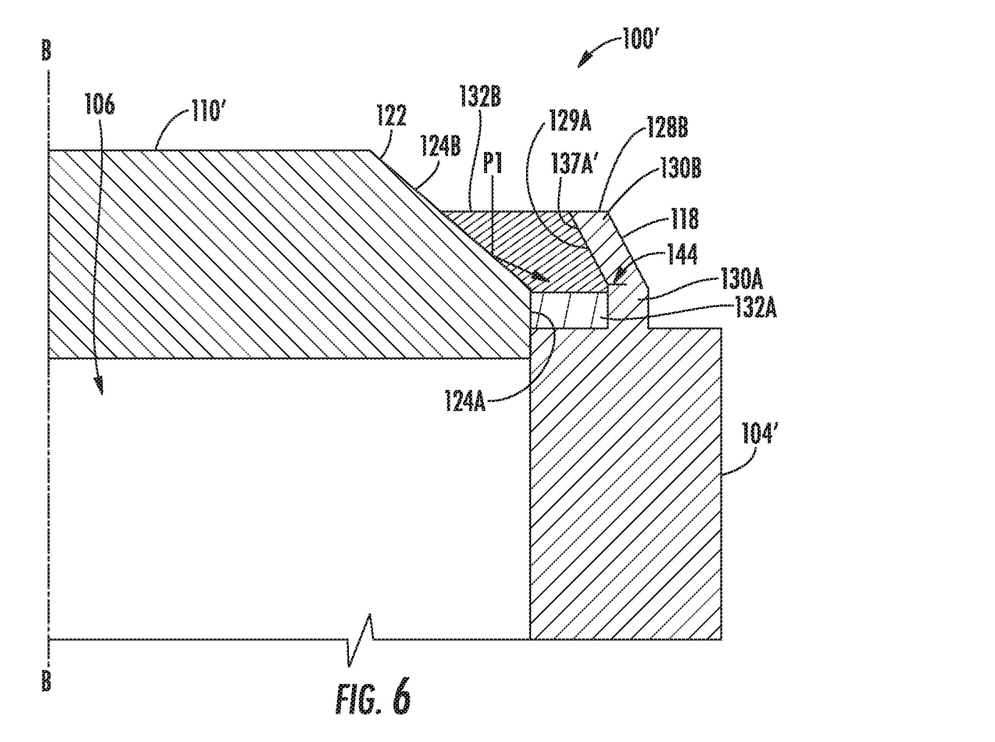
FIG. 6 is a cross-sectional side view illustrating another step of manufacturing the joint assembly of FIG. 1B including kinetically depositing a second metal layer.

FIG. 6 is a cross-sectional side view illustrating another step of manufacturing the joint 100' of FIG. 1B including kinetically depositing a second kinetically deposited metal layer 132B. In particular, the second kinetically deposited metal layer 132B is kinetically deposited proximate to and axially offset from the first kinetically deposited metal layer 132A. The second kinetically deposited metal layer 132B is attached to (e.g., directly physically contacts) the inner surface 129A of the bent portion 130B of the annular tab 118, the first kinetically deposited metal layer 132A, and the second side surface 124B of the sidewall 122 of the cap 110'. The second kinetically deposited metal layer 132B extends from the first kinetically deposited metal layer 132A towards (and up to) the second end 128B of the annular tab 118. The second kinetically deposited metal layer 132B forms an airtight barrier around the central axis of the housing 104' between the undercut surface 137A' of the annular tab 118 of the housing 104' and the cap 110'. The second end 128B of the annular tab 118 is machined to remove a portion of the second end 128B so that the second end 128 of the annular tab 118 is flush with the second kinetically deposited metal layer 132B.

Unlike in the previous steps, a direct line of sight is not necessary to deposit the second kinetically deposited metal layer 132B as the shockwave formed from kinetic deposition against the cap 110' (e.g., tapered edge) forces the particles to deflect toward the first kinetically deposited metal layer 132A and into the annular groove 126, such as along path P1.

Figure 7A:
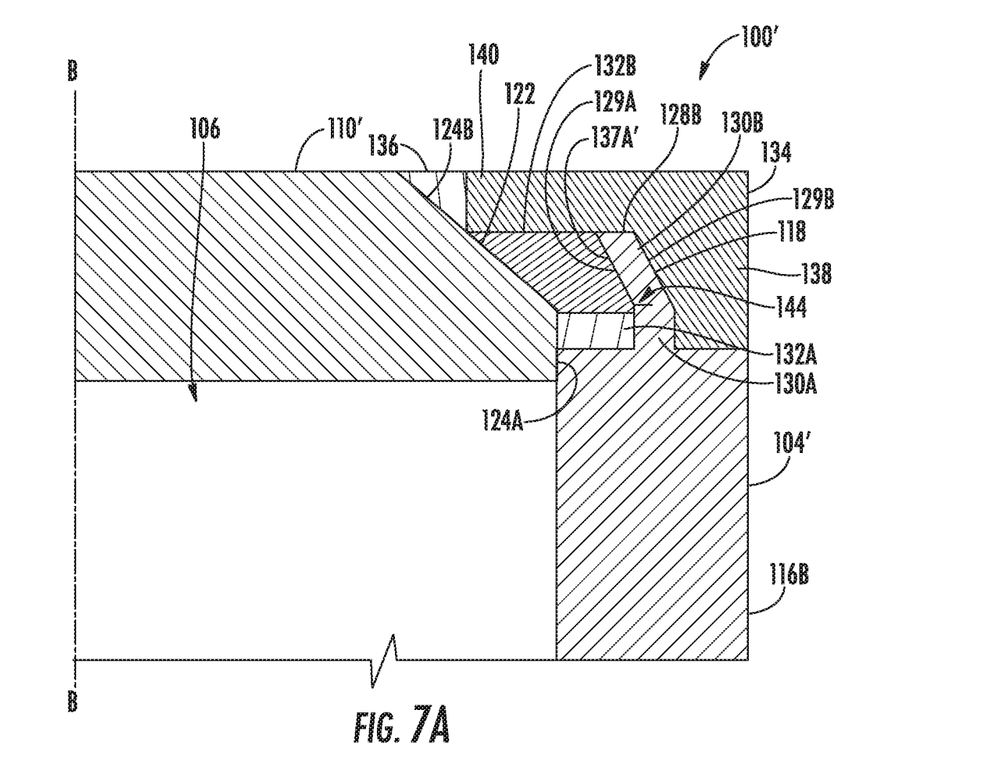
FIG. 7A is a cross-sectional side view illustrating another step of manufacturing the joint assembly of FIG. 1B including press fitting a retaining ring to an outer surface of the annular tab.
Figure 7B:
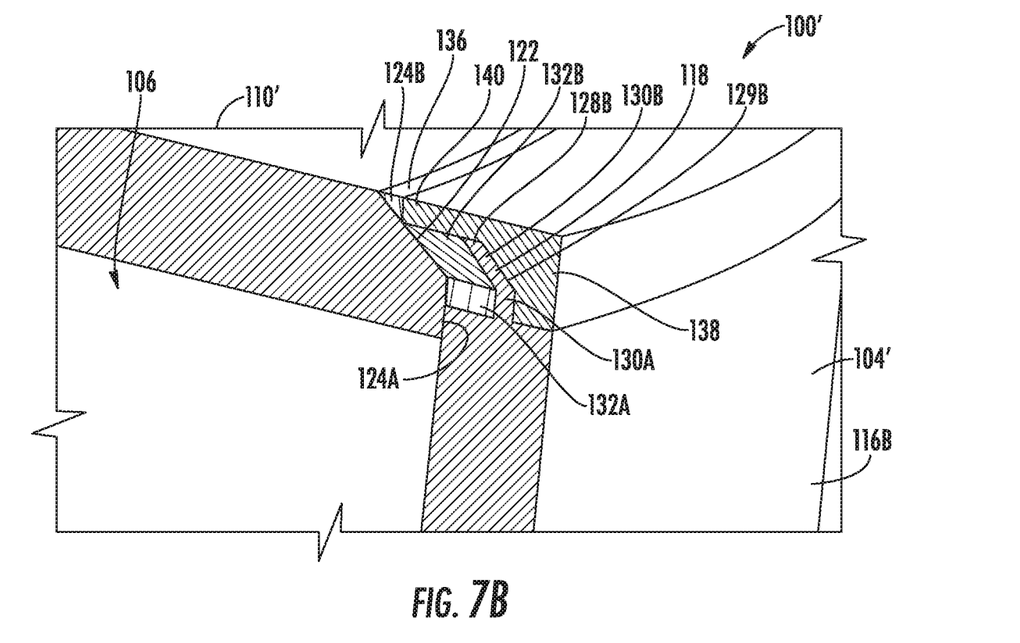
FIG. 7B is a cross-sectional perspective view of the step of FIG. 7A.

FIG. 7A is a cross-sectional side view illustrating another step of manufacturing the joint 100' of FIG. 1B including press fitting a retaining ring 134 to an outer surface 129B of the annular tab 118. FIG. 7B is a cross-sectional perspective view of the step of FIG. 7A. In particular, the retaining ring 134 is press fit to the housing 104' such that the annular body 138 of the retaining ring 134 frictionally engages the outer surface 129B of the annular tab 118, and may also engage an outer surface 116B of the housing 104'. At least a portion of the second kinetically deposited metal layer 132B is positioned between the first kinetically deposited metal layer 132A and an overhang wall 140 of the retaining ring 134 inwardly extending from the annular body 138 of the retaining ring 134.

A third kinetically deposited metal layer 136 is kinetically deposited between the retaining ring 134 and the cap 110' to attach the retaining ring 134 and the cap 110'.

Figure 8:
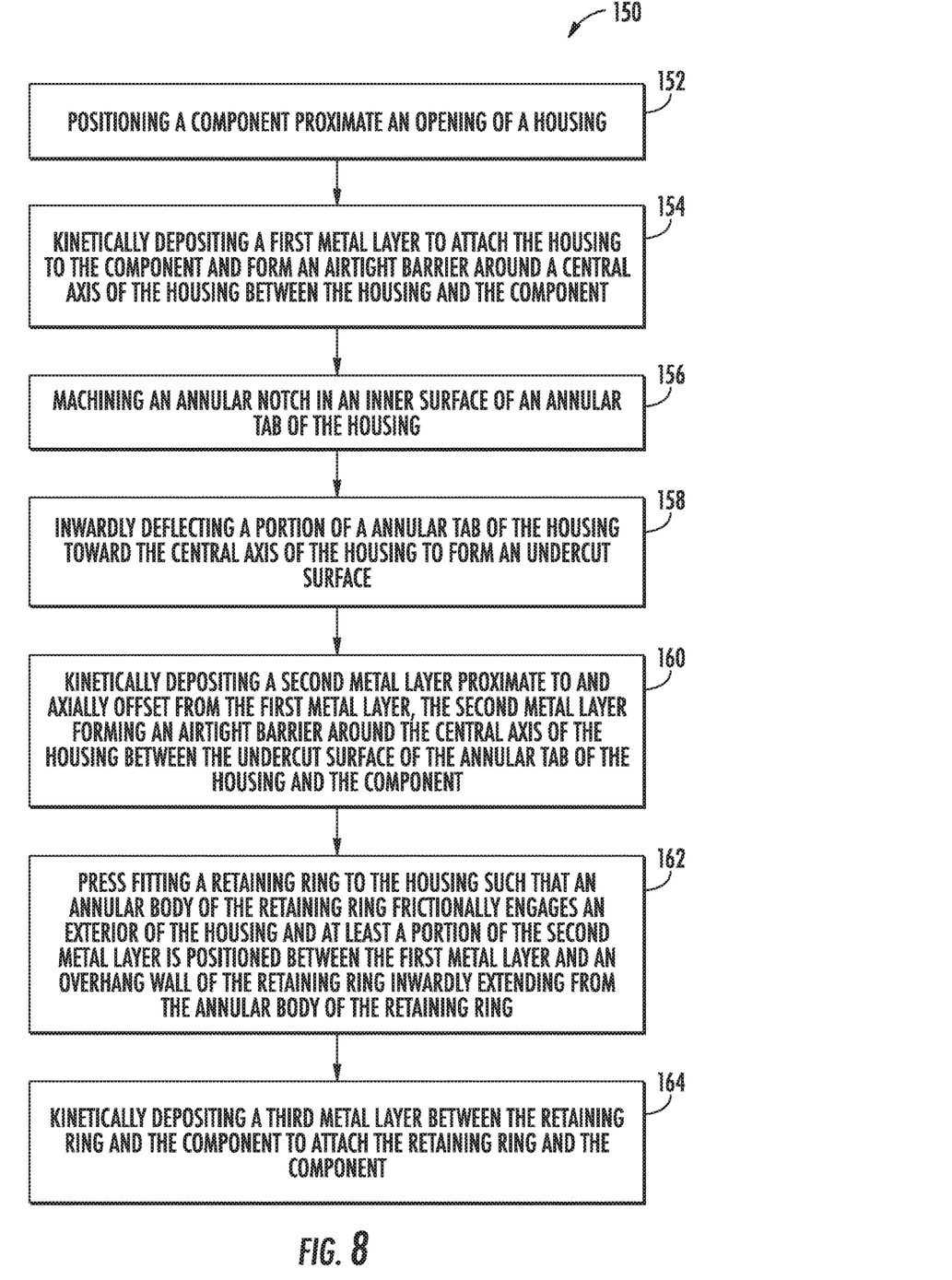
FIG. 8 is a flow chart illustrating the steps for manufacturing the joint assembly of FIGS. 1B-7B.

FIG. 8 is a flow chart illustrating the steps 150 for manufacturing the joint assembly of FIGS. 1B-7B. Step 152 includes positioning a cap 110' proximate an opening 106 of a housing 104'. Step 154 includes kinetically depositing a first kinetically deposited metal layer 132A to attach the housing 104' to the cap 110' and form an airtight barrier around a central axis B-B of the housing 104' between the housing 104' and the cap 110'. Step 156 includes machining an annular notch in an inner surface 129A of an annular tab 118 of the housing 104'. Step 158 includes inwardly deflecting (e.g., bending, folding, swaging, etc.) a portion of an annular tab 118 of the housing 104' toward the central axis B-B of the housing 104' to form an undercut surface 130. Step 160 includes kinetically depositing a second kinetically deposited metal layer 132B proximate to and axially offset from the first kinetically deposited metal layer 132A, the second kinetically deposited metal layer 132B forming an airtight barrier around the central axis B-B of the housing 104' between the undercut surface 130 of the annular tab 118 of the housing 104' and the cap 110'. Step 162 includes press fitting a retaining ring 134 to the housing 104' such that an annular body 138 of the retaining ring 134 frictionally engages an exterior 116B of the housing 104' and at least a portion of the second kinetically deposited metal layer 132B is positioned between the first kinetically deposited metal layer 132A and an overhang wall 140 of the retaining ring inwardly extending from the annular body 138 of the retaining ring 134. Finally, step 164 includes kinetically depositing a third kinetically deposited metal layer 136 between the retaining ring 134 and the cap 110' to attach the retaining ring 134 and the cap 110'.

Those skilled in the art will recognize improvements and modifications to the preferred embodiments of the disclosure. All such improvements and modifications are considered within the scope of the concepts disclosed herein and the claims that follow.

What is claimed is:

1. A joint assembly, comprising:
   a housing defining an opening and a central axis;
   a component positioned proximate the opening of the housing; and
   a seal assembly comprising a first kinetically deposited metal layer attaching the housing to the component and forming an airtight barrier around the central axis between the housing and the component.

2. The joint assembly of claim 1, wherein the first kinetically deposited metal layer comprises a plurality of plasticized metal particles.

3. The joint assembly of claim 1, wherein the housing comprises a missile casing.

4. The joint assembly of claim 1, wherein the component comprises a cap.

5. The joint assembly of claim 1, wherein the first kinetically deposited metal layer comprises metal and ceramic.

6. The joint assembly of claim 1, wherein the housing and the component form an annular groove therebetween, the first kinetically deposited metal layer formed within the annular groove.

7. The joint assembly of claim 1, wherein the housing comprises an annular tab proximate the opening, the annular tab forming an undercut surface inwardly extending toward the central axis of the housing.

8. The joint assembly of claim 7, wherein the seal assembly comprises a second kinetically deposited metal layer forming an airtight barrier around the central axis of the housing between the undercut surface of the annular tab of the housing and the component, the second kinetically deposited metal layer proximate to and axially offset from the first kinetically deposited metal layer.

9. The joint assembly of claim 8, wherein at least a portion of the second kinetically deposited metal layer extends further inward toward the central axis of the housing than the first kinetically deposited metal layer.

10. The joint assembly of claim 9, wherein the seal assembly further comprises a retaining ring having an annular body and an overhang wall inwardly extending from the annular body, the annular body press fit to an exterior of the housing, at least a portion of the second kinetically deposited metal layer positioned between the first kinetically deposited metal layer and the overhang wall.

11. The joint assembly of claim 10, wherein the seal assembly further comprises a third kinetically deposited metal layer attaching the overhang wall of the retaining ring and the component.

12. A method of manufacturing a joint assembly, comprising:
    positioning a component proximate an opening of a housing; and
    kinetically depositing a first metal layer to attach the housing to the component and form an airtight barrier around a central axis of the housing between the housing and the component.

13. The method of claim 12, wherein the housing comprises a missile casing.

14. The method of claim 12, wherein the component comprises a cap.

15. The method of claim 12, wherein the first kinetically deposited metal layer comprises aluminum chrome.

16. The method of claim 12, further comprising machining an annular notch in an inner surface of an annular tab of the housing.

17. The method of claim 12, further comprising inwardly deflecting a portion of an annular tab of the housing toward the central axis of the housing to form an undercut surface.

18. The method of claim 17, further comprising kinetically depositing a second metal layer proximate to and axially offset from the first metal layer, the second metal layer forming an airtight barrier around the central axis of the housing between the undercut surface of the annular tab of the housing and the component.

19. The method of claim 18, wherein at least a portion of the second kinetically deposited metal layer extends further inward toward the central axis of the housing than the first kinetically deposited metal layer.

20. The method of claim 19, further comprising press fitting a retaining ring to the housing such that an annular body of the retaining ring frictionally engages an exterior of the housing and at least a portion of the second metal layer is positioned between the first metal layer and an overhang wall of the retaining ring inwardly extending from the annular body of the retaining ring.

21. The method of claim 20, further comprising kinetically depositing a third metal layer between the retaining ring and the component to attach the retaining ring and the component.

\* \* \* \* \*